UNITED STATES PATENT OFFICE.

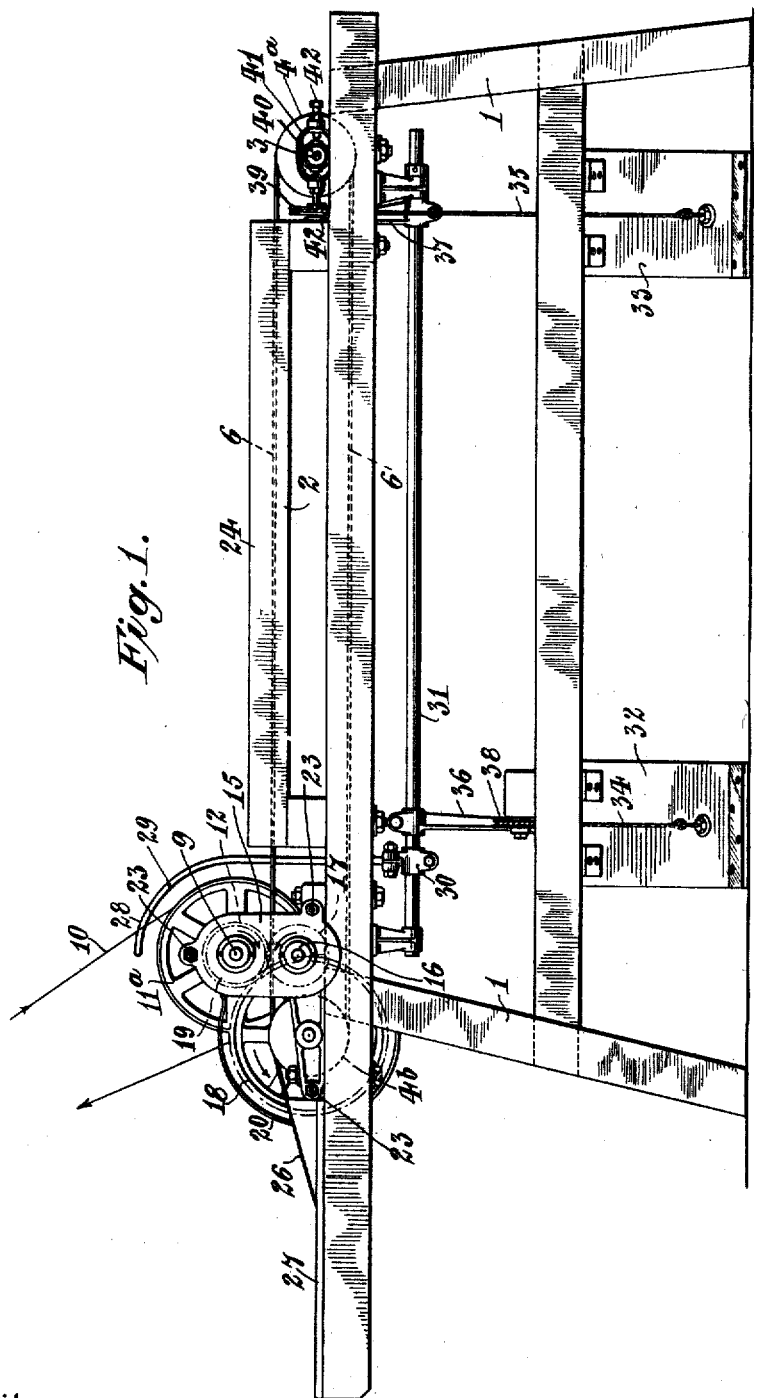

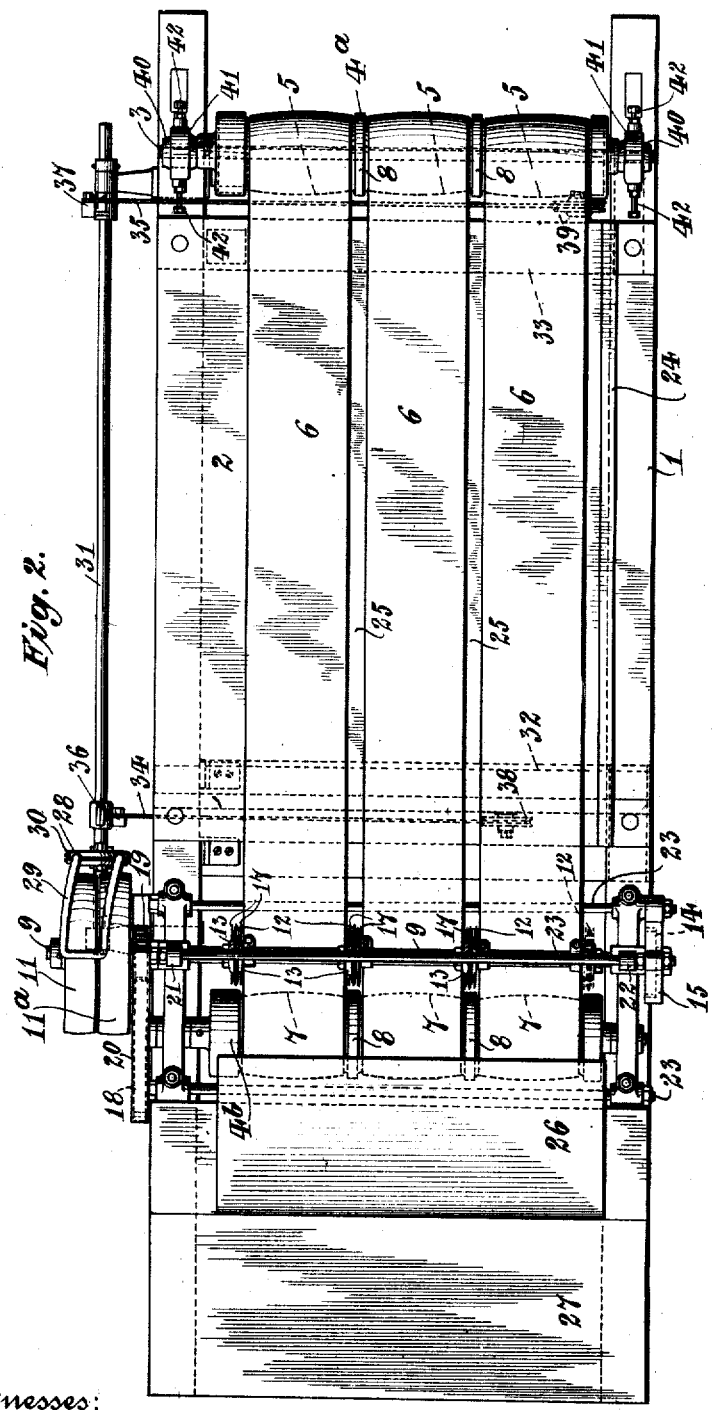

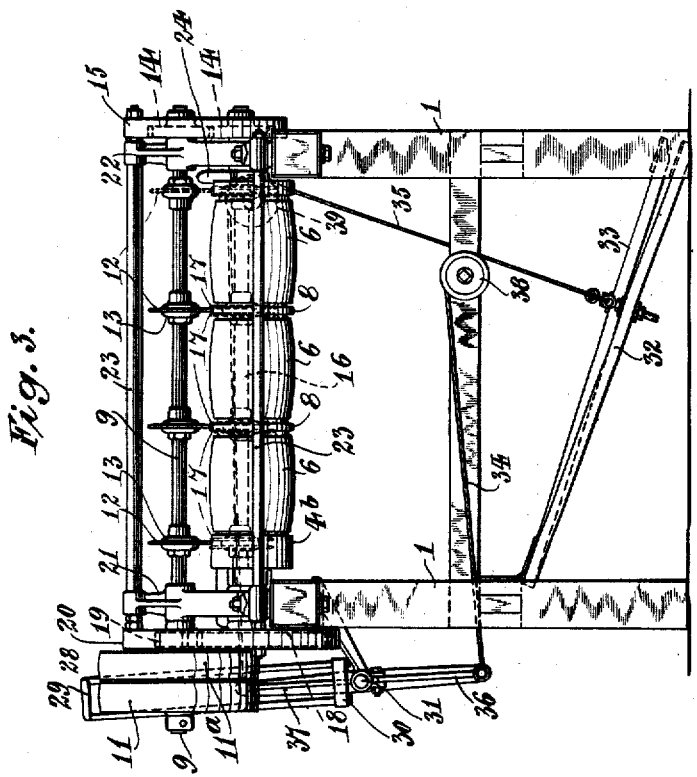

KARL GAMMEL, OF CLEVELAND, OHIO, ASSIGNOR TO THE CLEVELAND MACARONI COMPANY, OF CLEVELAND, OHIO, A CORPORATION OF OHIO.

MACHINE FOR CUTTING DRIED PASTES.

1,242,542.   Specification of Letters Patent.   Patented Oct. 9, 1917.

Application filed September 1, 1911. Serial No. 647,181.

*To all whom it may concern:*

Be it known that I, KARL GAMMEL, a subject of the Emperor of Germany, residing at Cleveland, in the county of Cuyahoga and State of Ohio, have invented certain new and useful Improvements in Machines for Cutting Dried Pastes, of which the following is a specification, reference being had to the accompanying drawings, forming a part hereof.

It is well known that dried, edible pastes, such as marconi, spaghetti, and similar products, are extremely brittle and that the breakage losses from handling such products preparatory to placing the same in shipping packages is very large. Heretofore, it has been customary to break the product manually into the desired lengths in order to prevent breakage and waste as much as possible. These food products are usually made in a press in the form of tubes which are usually dried by hanging them over a support such as a rod, and this practice results in forming a double stick, the two parallel portions of which are connected by a bend or bow. Owing to the difficulty of breaking the particles evenly when the operation was performed by hand, the bent portions are generally of irregular lengths and for this reason become a waste product entailing a loss.

The primary object of my invention is to provide means whereby edible paste products, such as macaroni, spaghetti, and the like, may be cut into accurate lengths with a minimum of breakage.

A further object of the invention is to provide means whereby the product may be transferred to a suitable conveyer while still suspended from the rods or supports on which the drying operation takes place, thus avoiding any handling of the macaroni by operators.

A further object of the invention is to provide means whereby a clean and even cut or break may be made without shattering the adjacent end and causing a breakage.

A further object of the invention is to provide a suitable arrangement of cutters and conveyers so that the cutting operation may be performed automatically and so that the length adjacent to the curved end of the tubes or strips may be packed with the outer portions.

Still another object of the invention is to provide an arrangement of cutters which will enable the bent portions to be cut off of uniform length so as to produce a useful product, and if desired to enable the bends to be left intact, integrally connecting the two adjacent lengths of the double stick.

Further objects of the invention will be hereinafter more fully set forth in the following description of one form of mechanism embodying the invention which consists in the new and novel features of construction and combination of parts set forth in the following description and claims.

In the accompanying drawings:

Figure 1 is a side elevation of a machine embodying my invention.

Fig. 2 is a plan of the machine.

Fig. 3 is an end elevation.

The machine comprises a frame 1, the upper portion of which supports a table, or plate 2 in a horizontal position. At one end of this table or plate 2 a shaft 3 is supported in suitable bearings, and this shaft carries a roller 4ª having necks 5 forming pulleys for a plurality of horizontal conveyers or belts 6. The upper runs of these belts lie upon and pass longitudinally on the upper face of the table, while the lower runs pass under the table. At the opposite ends, these belts pass around a roller 4ᵇ similar to the roller 4ª and provided with necks 7 forming pulleys like pulleys 5 and receiving the belts as shown.

Between the necks 5 and 7 of these rollers, integral collars 8 are formed to separate the belts as indicated. Power is applied to the main shaft 9 of the machine by means of a belt 10 running over the pulley 11 and the main shaft 9 extends transversely across the machine near one end thereof, and is provided with a plurality of single knives or cutters 12 in the form of disks, attached to suitable hubs 13, secured on to the shaft 9 as shown in Fig. 3. By suitable gears inclosed in a gear case 15, the main shaft 9 drives a countershaft 16 which is disposed parallel to the shaft 9 and below it. This countershaft 16 carries a plurality of knives or cutters 17 which are similar to the cutters 12 and arranged in pairs. Each pair coöperating with one of the cutters 12.

The arrangement is such that each cutter 12 is disposed between the planes of the cutters 17. The roller 4ᵇ at the head of the left end of the machine, as shown in Fig. 2, is continuously rotated in the direction of the arrow indicated in Fig. 1 by means of a gear wheel 18 rigid on the shaft of the roller, meshing with a pinion 19 which is carried by the shaft 9, and these gears are inclosed in a suitable gear case 20 as indicated. The shafts 9 and 16 are rotatably supported at their ends in bearings formed in brackets 21 and 22. Said brackets being held in a fixed relation by a plurality of cross bars or horizontal braces 23.

It should be understood that the macaroni or other substance to be cut, is in the form of sticks laid transversely on the table and is advanced toward the cutters by the moving belts 6, and in order to guide the sticks as they advance, near one edge of the table, I provide a guide board or rail 24 which projects upwardly as indicated. The pulleys 5 and 7 are crowned slightly as shown so that their edges are depressed in the vicinity of the knives or cutters, and, as shown most clearly in Fig. 2, the cutters are disposed opposite the gaps or openings 25 between the belts or beyond the edges of the outermost belts. The macaroni sticks are forced between the upper cutters 12 and the lower cutters 17 and are severed into lengths which pass on to an inclined guide plate 26 down which they pass on to a horizontal table 27 or delivery plate; from this table, they can be removed by operators and placed in packing boxes.

The driving belt 10 normally runs on a tight pulley 11 but may be shifted over to a loose pulley 11ᵃ by a belt shifter 28 comprising a yoke 29 through which the belt runs, said yoke having its lower end secured by a clamp 30 to a rock shaft 31 extending longitudinally at the side of the machine. This rock shaft may be rocked so as to place the belt on either pulley by means of two treadles 32 and 33, connected respectively by cords 34 and 35 to rigid arms 36 and 37 carried by the rock shaft. As shown in Fig. 3, these cords pass around suitable guide pulleys 38 and 39. An arm 36 extends downwardly, while the arm 37 extends upwardly so that the depression of these treadles will rock the shaft in opposite directions. The shaft 3 of the roller 4ᵃ is mounted in boxes 40 which are adjusted in horizontal guides 41 by suitable adjusting screws 42. This enables the tension of the belts 6 to be adjusted as desired.

In Figs. 2 and 3, the cutter, which is adjacent to the guide rail 24, is indicated in dotted lines to show that this cutter may be removed when it is desired not to sever the bends of the double sticks, but when this cutter is in place, the bends will be cut off of substantially uniform lengths. In practice, the dried pastes or sticks are brought from the drying room or machine in the form of double sticks connected by integral loops which suspend the sticks on a support or rod. These double sticks are then laid transversely on the table 2 with the bends of the sticks alined against the inner face of the guide rail 24. The rod which supported the paste sticks is then pulled out longitudinally of the table so as to withdraw it from all the sticks. Thereupon, the machine is set in operation by a pressure upon the treadle 32 causing the conveyer or belts 6 to carry the product toward the cutters which are adjusted upon their shafts in such a manner that the lengths cut adjacent to the curved ends will be very slightly longer than the other lengths. Then, when the single sticks and the unsevered, bent sticks are packed together they will fit neatly in the package without loss of space, the single sticks fitting in the space between the stems of the double sticks.

Owing to the arrangement of the cutters, a perfectly even and smooth cut or break is obtained without cracking or shattering the adjacent ends of the cut portions. By having the portions of accurately predetermined lengths, it is obvious that more product by weight can be placed into a given package than is possible when various other lengths and broken pieces are mixed with longer portions. This construction also permits the product to be cut ready for packing without handling by operators which is required when the breaking of the macaroni is performed manually. Although I have shown one form of mechanism embodying my invention, it is obvious that various changes within the skill of a mechanic can be made therein without departing from the spirit of the invention, providing the means set forth in the following claims be employed.

I claim as my invention:

1. In a machine for cutting dried edible paste sticks, a horizontal table, a plurality of belts extending longitudinally of said table and having their carrying sides supported by said table, a pair of horizontal shafts disposed transversely of said table and in a plane perpendicular to the upper run of said belts the upper shaft being above said belts and the lower shaft being under the upper runs of said belts, rotating collars disposed between said belts to maintain them in spaced relation, a plurality of cooperating cutters carried by said shafts and disposed opposite the spaces between said belts, means for driving said belts to advance the sticks thereupon to said cutters and an incline adjacent one end of the upper run of belts positioned to remove the cut sticks from the belts.

2. In a machine for cutting dried edible paste sticks, the combination with a roller having a plurality of necks to form pulleys having a greater diameter adjacent their centers than adjacent their opposite ends, a plurality of belts looped about said pulleys, cutters between said belts revoluble in planes transversely of the normal plane of the belts and having their cutting edges disposed adjacent the edges of the belt as they are depressed out of their normal plane by passing about the reduced ends of the pulleys.

3. A machine for cutting dried edible paste in the form of double sticks connected by integral loops, comprising a horizontal table, a pair of rollers having a plurality of pulleys, a plurality of belts passing over said pulleys and extending longitudinally on said table, said belts being disposed apart, means for maintaining said belts in set position, a transverse shaft passing over said belts, a second transverse shaft passing under the upper runs of said belts and opposite the said first shaft, said shafts being provided with coöperating cutters, said cutters being disposed opposite the spaces between said belts and beyond the outer edge of said belts, and means for driving said belts, a guiding means disposed relatively close to one of the edge cutters and adapted to guide the loop ends of the sticks into position to be severed at the loop.

4. In a machine for cutting dried edible pastes, a cutting device consisting of a cutter in the form of a single flat disk and pair of cutters in the form of single disks similar to the first named disk and having their edges coöperating with the edges of said first cutter during the severing of the goods to form a rigid support and permit a clean break, said first cutter being in a plane between the planes of said last named cutters, 5. In a machine for cutting dried edible pastes, a cutting device consisting of three similarly shaped cutters in the form of flat disks, two of said cutters being spaced apart and arranged on one side of the normal path of travel of the goods and the other cutter being disposed on the other side of said path and entirely between the planes of the first mentioned cutters.

This specification signed and witnessed this 28th day of August, A. D. 1911.

KARL GAMMEL.

Witnesses:
G. R. COLLAR,
E. M. HOLMGREN.

Copies of this patent may be obtained for five cents each, by addressing the "Commissioner of Patents, Washington, D. C."